(12) United States Patent
Lee et al.

(10) Patent No.: US 9,391,687 B2
(45) Date of Patent: Jul. 12, 2016

(54) APPARATUS AND METHOD FOR MINIMIZING ERRORS BY A CELL EDGE USER IN A MULTI-CELL COMMUNICATION SYSTEM

(75) Inventors: Joo-Hyun Lee, Suwon-si (KR); Sunghwan Kim, Suwon-si (KR); Jong-Hyeuk Lee, Anyang-si (KR); Chung-Yong Lee, Seoul (KR); Myoung-Seok Kim, Seoul (KR); Hoon-Dong Noh, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 159 days.

(21) Appl. No.: 13/262,485

(22) PCT Filed: Apr. 2, 2010

(86) PCT No.: PCT/KR2010/002051
§ 371 (c)(1), (2), (4) Date: Sep. 30, 2011

(87) PCT Pub. No.: WO2010/114341
PCT Pub. Date: Oct. 7, 2010

(65) Prior Publication Data
US 2012/0020425 A1 Jan. 26, 2012

(30) Foreign Application Priority Data
Apr. 2, 2009 (KR) .................. 10-2009-0028648

(51) Int. Cl.
*H04B 7/02* (2006.01)
*H04B 7/06* (2006.01)
*H04L 25/02* (2006.01)

(52) U.S. Cl.
CPC .............. *H04B 7/0639* (2013.01); *H04B 7/024* (2013.01); *H04L 25/0246* (2013.01); *H04L 25/0228* (2013.01)

(58) Field of Classification Search
CPC .. H04B 7/0639; H04B 7/024; H04L 25/0228; H04L 25/0246
USPC .................................................. 375/267, 260
See application file for complete search history.

(56) References Cited

U.S. PATENT DOCUMENTS 6,665,521 B1   12/2003   Gorday et al.
7,873,113 B2 *  1/2011   Takano et al. ............. 375/267
(Continued)

FOREIGN PATENT DOCUMENTS

KR   10-2002-0008301 A   1/2002
KR   10-2007-0086976 A   8/2007
(Continued)

OTHER PUBLICATIONS

H. Zhang, et al. "Cochannel Interference Mitigation and Cooperative Processing in Downlink Multicell Multiuser MIMO Networks," European Journal on Wireless Communications and Networking, 2004, No. 2, pp. 222-235, 4th Quarter, 2004.*

(Continued)

*Primary Examiner* — Daniel Washburn
*Assistant Examiner* — Berhanu Tadese
(74) *Attorney, Agent, or Firm* — Jefferson IP Law, LLP

(57) ABSTRACT

The present invention relates to performance improvement in a cell edge, particularly, to a method for selecting a precoder for a terminal in a multiple antenna system, wherein the method comprises: performing channel estimation for reference signals of a serving base station and another base station; determining a minimum singular value by using the channel estimation result; and if a complete collaborative feedback structure is used, feeding back a table of the determined, minimum singular value to the base stations.

20 Claims, 10 Drawing Sheets

(56) References Cited

U.S. PATENT DOCUMENTS

| | | | |
|---|---|---|---|
| 8,023,457 B2* | 9/2011 | Kotecha et al. | 370/329 |
| 8,081,692 B1* | 12/2011 | Zhang et al. | 375/260 |
| 8,233,926 B2* | 7/2012 | Heath et al. | 455/501 |
| 8,243,707 B2* | 8/2012 | Choi et al. | 370/342 |
| 8,345,693 B1* | 1/2013 | Kim | 370/400 |
| 8,351,524 B2* | 1/2013 | Zhou | 375/260 |
| 8,369,788 B2* | 2/2013 | Kim et al. | 455/63.1 |
| 8,462,646 B2* | 6/2013 | Barberis et al. | 370/252 |
| 2005/0111599 A1* | 5/2005 | Walton | H04B 1/71072 375/347 |
| 2006/0120477 A1* | 6/2006 | Shen | H04B 7/024 375/267 |
| 2006/0120478 A1* | 6/2006 | Kim | H04B 7/0617 375/267 |
| 2007/0223423 A1* | 9/2007 | Kim et al. | 370/334 |
| 2007/0248172 A1* | 10/2007 | Mehta | H04B 7/024 375/260 |
| 2007/0253508 A1* | 11/2007 | Zhou | H04B 7/0626 375/267 |
| 2007/0280116 A1* | 12/2007 | Wang et al. | 370/236 |
| 2007/0280386 A1* | 12/2007 | Waes et al. | 375/347 |
| 2007/0281746 A1* | 12/2007 | Takano et al. | 455/562.1 |
| 2008/0037669 A1* | 2/2008 | Pan et al. | 375/260 |
| 2008/0056402 A1* | 3/2008 | Jang et al. | 375/267 |
| 2008/0080459 A1* | 4/2008 | Kotecha et al. | 370/342 |
| 2008/0212461 A1* | 9/2008 | Pande et al. | 370/203 |
| 2008/0219375 A1* | 9/2008 | Yun et al. | 375/267 |
| 2009/0067402 A1* | 3/2009 | Forenza | H04B 7/0626 370/343 |
| 2009/0103486 A1* | 4/2009 | Hunukumbure et al. | 370/329 |
| 2009/0117911 A1* | 5/2009 | Molisch | H04B 7/022 455/450 |
| 2009/0161605 A1* | 6/2009 | Shen et al. | 370/328 |
| 2009/0181708 A1* | 7/2009 | Kim et al. | 455/501 |
| 2009/0215480 A1* | 8/2009 | Kim | H04B 7/024 455/501 |
| 2009/0225720 A1* | 9/2009 | Molisch | H04B 7/022 370/330 |
| 2009/0279630 A1* | 11/2009 | Ma et al. | 375/267 |
| 2009/0285325 A1* | 11/2009 | Zhou | 375/267 |
| 2009/0291699 A1* | 11/2009 | Heath et al. | 455/501 |
| 2010/0284359 A1* | 11/2010 | Kim et al. | 370/329 |
| 2010/0296591 A1* | 11/2010 | Xu et al. | 375/259 |
| 2010/0309998 A1* | 12/2010 | Jung et al. | 375/260 |
| 2010/0322223 A1* | 12/2010 | Choi et al. | 370/342 |
| 2011/0044193 A1* | 2/2011 | Forenza | H04B 7/024 370/252 |
| 2011/0090945 A1* | 4/2011 | Yang | H04B 7/024 375/227 |
| 2011/0255625 A1* | 10/2011 | Song | H04B 7/024 375/267 |
| 2012/0014468 A1* | 1/2012 | Wu et al. | 375/260 |
| 2012/0020319 A1* | 1/2012 | Song | H04B 7/0632 370/330 |
| 2012/0044830 A1* | 2/2012 | Kim et al. | 370/252 |
| 2012/0082118 A1* | 4/2012 | Long et al. | 370/329 |
| 2012/0108278 A1* | 5/2012 | Kim | H04B 7/024 455/501 |
| 2012/0147992 A1* | 6/2012 | Yang et al. | 375/296 |
| 2012/0264388 A1* | 10/2012 | Guo et al. | 455/307 |

FOREIGN PATENT DOCUMENTS

| | | |
|---|---|---|
| KR | 10-2009-0017904 A | 2/2009 |
| WO | WO 2010075640 A1 * | 7/2010 |

OTHER PUBLICATIONS

Love et al., "Limited Feedback Unitary Precoding for Spatial Multiplexing Systems" cited in Information Theory, IEEE transactions vol. 51, Issue 8, pp. 2967-2976, Aug. 2005.*

Mehta et al. "Asynchronous Interference Mitigation in Cooperative Base Station Systems," IEEE Transactions on Wireless Communications, vol. 7, No. 1, January 2008.*

"Inter-Cell Interference Mitigation Through Limited Coordination", 3GPP TSG RAN WG1 Metting #55, R1-084173, Nov. 10-14, 2008.*

Zhang, et al., "Coordinated Multi-Cell MIMO Systems With Cellular Block Diagonalization", IEEE 2007, pp. 1669-1673.*

Zhang et al., "Coordinated Multi-Cell MIMO Systems with Cellular Block Diagonalization," Signals, Systems and Computers, IEEE_ACSSC 2007, vol., No., pp. 1669-1673, Nov. 4-7, 2007.*

* cited by examiner

APPARATUS AND METHOD FOR MINIMIZING ERRORS BY A CELL EDGE USER IN A MULTI-CELL COMMUNICATION SYSTEM

PRIORITY

This application is a National Stage application under 35 U.S.C. §371 of an International application filed on Apr. 2, 2010 and assigned application No. PCT/KR2010/002051, and claims the benefit under 35 U.S.C. §365(b) of a Korean patent application filed Apr. 2, 2009 in the Korean Intellectual Property Office and assigned application No. 10-2009-0028648, the entire disclosure of which is hereby incorporated by reference.

BACKGROUND OF THE INVENTION

1. Field of the Invention

The present invention is for overcoming inter-cell interference in a multi-cell environment and improving performance for a receiver in a cell edge. Particularly, the present invention, which relates to a transmitter suitable to a case of nulling Other Cell Interference (OCI) in a receiver, relates to an apparatus and method for minimizing the entire system error.

2. Description of the Related Art

A terminal of a cell edge simultaneously receives not only a signal transmitted from its own cell but also signals of neighboring other cells. The signals received from the other cells act as interference, acting as a main cause of limiting the performance of the terminal. That is, there occurs a problem that Inter-Cell Interference (ICI) results in system capacity or throughput performance degradation and the like.

And, this problem works more seriously in a Multiple Input Multiple Output (MIMO) system. Accordingly, research on technologies for overcoming this ICI and improving performance is being carried out. This is exemplified as a codebook-based error minimization technique (quantization preprocessor) for a single user, and a codebook-based ICI reduction technique.

The quantization preprocessor, which is of a MIMO preprocessing technique of minimizing errors in a single cell, single user environment, does not take interference from neighboring cells into consideration. And, in a case where there are many receive antennas compared to the total number of transmission streams, a receiver can null OCI through a nulling filter. However, a transmission precoder (code word) is selected without considering the OCI-Nulling Filter (OCI-NF), so a problem occurs that the OCI-NF results in performance degradation.

The codebook-based ICI reduction technique, which is a technique of minimizing OCI using a precoder, brings about the improvement of a Signal to Noise and Interference Ratio (SINR). But, this technique cannot completely null interference, so there is a problem that, in a case where the size of interference is very large, it is unsuitable to real reception.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for minimizing errors by a cell edge user in a multi-cell communication system.

Another object of the present invention is to provide an apparatus and method for minimizing errors of a cell edge through codebook-based MIMO precoding and a receiver OCI-NF.

According to a 1st aspect for achieving the objects of the present invention, a precoder selection method of a terminal in a multiple antenna system is characterized by including performing channel estimation for reference signals of a serving base station and another base station, determining a minimum singular value using the channel estimation result, and, in a case where a full feedback cooperative scheme is used, feeding back a table of the determined minimum singular value to the base station.

According to a 2nd aspect for achieving the objects of the present invention, a precoder selection method of a base station in a multiple antenna system is characterized by including receiving setting information from a terminal, in a case where a cooperative scheme is used, exchanging the setting information with setting information of another base station, in a case where the cooperative scheme is used, selecting a code word minimizing errors for the entire system based on the setting information and the setting information of the another base station, and, in a case where the cooperative scheme is not used, selecting a code word minimizing errors for the entire system based on the setting information.

According to a 3rd aspect for achieving the objects of the present invention, an apparatus of a terminal of selecting a code word in a multiple antenna system is characterized by including a channel estimator for performing channel estimation for reference signals of a serving base station and another base station, a minimum singular value calculator for determining a minimum singular value using the channel estimation result, and a transmitter for, in a case where a full feedback cooperative scheme is used, feeding back a table of the determined minimum singular value to the base station.

According to a 4th aspect for achieving the objects of the present invention, an apparatus of a base station of selecting a precoder in a multiple antenna system is characterized by including a minimum singular value comparator for receiving setting information from a terminal, and exchanging and comparing with setting information of another base station, and a code word selector for, in a case where a cooperative scheme is used, exchanging the setting information with setting information of another base station, selecting a code word minimizing errors for the entire system based on the setting information and the setting information of the another base station and, in a case where the cooperative scheme is not used, selecting a code word minimizing errors for the entire system based on the setting information.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE PREFERRED EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Below, the present invention describes an apparatus and method for minimizing errors by a cell edge user in a multi-cell communication system.

The present invention selects a precoder for minimizing errors of a cell edge considering a receiver OCI-NF. That is, the present invention nulls OCI through the receiver OCI-NF and selects a codebook-based precoder such that the entire errors of the cell edge are minimized considering the OCI-NF.

The present invention is composed of a cooperative technique and a non-cooperative technique depending on the existence or non-existence of information exchange between base stations in code word selection.

The cooperative technique is composed of a full feedback or reduced feedback method according to a cooperative code word selection method. The non-cooperative technique is composed of a non-cooperative code word selection method and a simple index feedback method.

Figure 1:
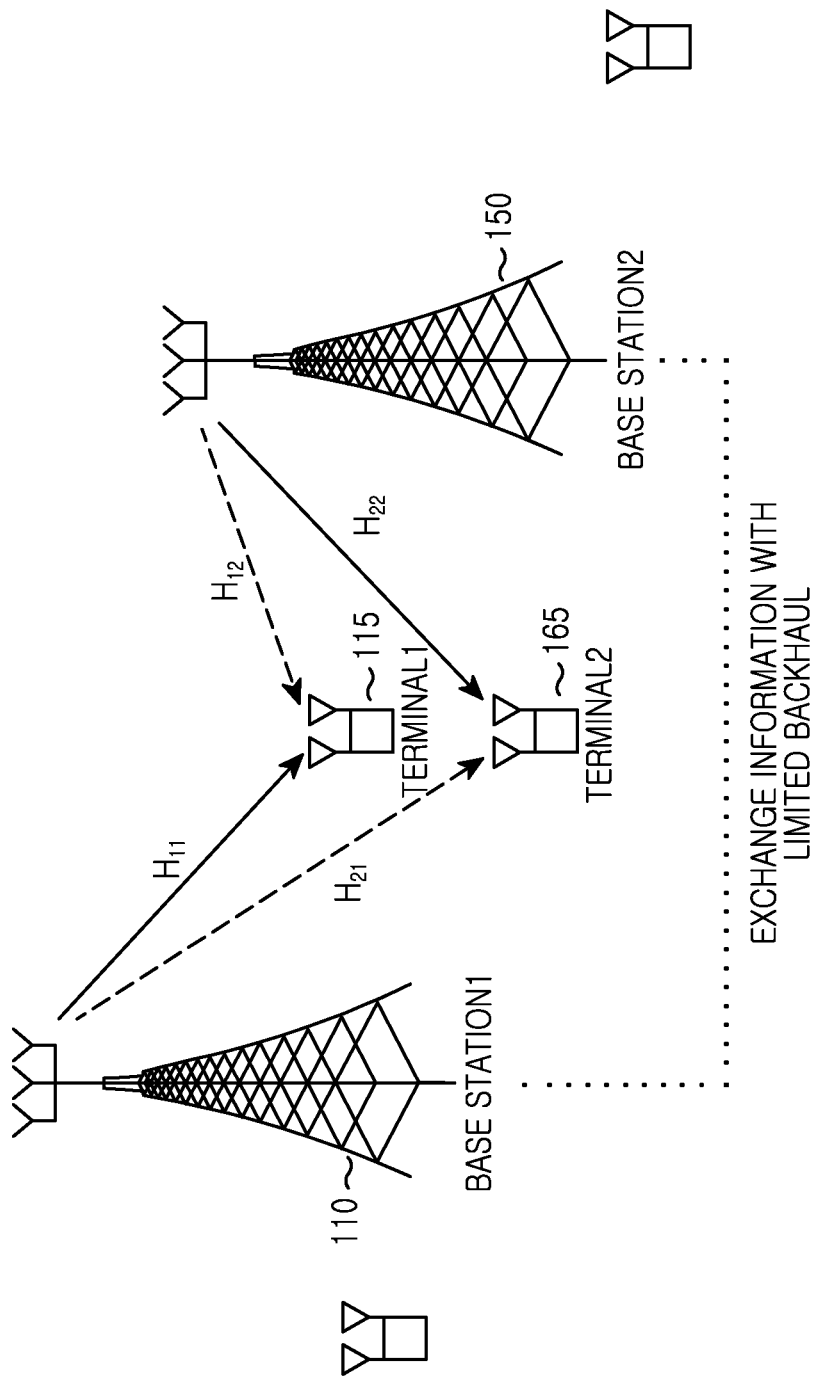
FIG. 1 is a diagram illustrating a communication system according to an exemplary embodiment of the present invention.

FIG. 1 is a diagram illustrating a communication system according to an exemplary embodiment of the present invention.

Referring to FIG. 1, it is a typical environment where ICI exists, and illustrates a case where there are two terminals 115 and 165 allocated the same time and frequency resources in a cell edge.

Here, a base station1 110 transmits data to the terminal1 115, and a base station2 150 to the terminal2 165. If defining the number of transmit antennas of the base stations 110 and 150 as $n_T$ and the number of receive antennas of the terminals 115 and 165 as $n_R$, and defining signals received by the terminal1 115 and the terminal2 165 as $n_R \times 1$ vectors $y_1$ and $y_2$, respectively, it is given as in Equation below.

$$\begin{bmatrix} y_1 \\ y_2 \end{bmatrix} = \begin{bmatrix} H_{11} & H_{12} \\ H_{21} & H_{22} \end{bmatrix} \begin{bmatrix} x_1 \\ x_2 \end{bmatrix} + \begin{bmatrix} n_1 \\ n_2 \end{bmatrix} \qquad (1)$$

Here, '$x_b$' is a ($n_T \times 1$) signal vector transmitted by a base station (b), '$H_{mb}$' is a ($n_R \times n_T$) channel matrix between the base station (b) and a terminal (u), and '$n_m$', which are ($n_R \times 1$) noise vectors, are independent from each other and have a normal distribution whose distribution is equal to '$N_0$'.

The transmit signal ($x_b$), that a ($n_S \times 1$) transmission symbol ($s_b$) passes through a ($n_T \times n_S$) codebook-based precoder ($T_b$), can be expressed as in $x_b = T_b s_b$.

If using filters ($R_1$) and ($R_2$) for nulling interference channels ($H_{12}T_2$), ($H_{21}T_1$) from other cells in the receiver terminal1 115 and terminal2 165, respectively, a reception signal is given as in Equation below.

$$\begin{bmatrix} z_1 \\ z_2 \end{bmatrix} = \begin{bmatrix} R_1 & \\ & R_2 \end{bmatrix} \begin{bmatrix} H_{11} & H_{12} \\ H_{21} & H_{22} \end{bmatrix} \begin{bmatrix} T_1 & \\ & T_2 \end{bmatrix} \begin{bmatrix} s_1 \\ s_2 \end{bmatrix} + \begin{bmatrix} R_1 & \\ & R_2 \end{bmatrix} \begin{bmatrix} n_1 \\ n_2 \end{bmatrix} \qquad (2)$$

$$= \begin{bmatrix} R_1 H_{11} T_1 & \\ & R_2 H_{22} T_2 \end{bmatrix} \begin{bmatrix} s_1 \\ s_2 \end{bmatrix} + \begin{bmatrix} n'_1 \\ n'_2 \end{bmatrix}$$

A condition for nulling interference channels from other cells is that the number of receive antennas should be $N_r \geq 2n_S$.

Dividing into a cooperative technique and a non-cooperative technique, the present invention describes a method of selecting a precoder ($T_b$) such that errors of a cell edge are minimized in circumstances where interference is completely nulled as in Equation 2 above using an OCI-NF.

First, the cooperative scheme is described below.

A codebook-based precoder ($T_b$) to be used in a transmitter selects within a codebook ($W = \{W_1, W_2, \ldots, W_L\}$) to minimize an error rate in a receiver and feeds back a corresponding index to the transmitter.

If a receiver is a linear receiver such as a Zero Forcing (ZF) decoder, a reception SNR of a $k^{th}$ sub stream of a terminal (u) is given as in Equation below.

$$SNR_{u,k}^{(ZF)} = \frac{E_S}{n_S N_0 ((R_u T_{uu} H_u)^H R_u H_{uu} T_u)_{k,k}^{-1}} \quad (3)$$

Here, an average symbol error probability is bound by a minimum sub stream SNR, so reducing the average symbol error probability needs maximizing the minimum sub stream SNR. The minimum sub stream SNR is bound as in Equation below.

$$SNR_{u,min}^{(ZF)} \geq \lambda_{u,min}^2 (R_u H_{uu} T_u) \frac{E_S}{n_S N_0} \quad (4)$$

Here, the '$\lambda_{u,\,min} (R_u H_{uu} T_u)$' is a Minimum Singular Value (MSV) of the $R_u H_{uu} T_u$. A code word selection technique based on a minimum sub stream SNR needs to obtain an SNR for each sub stream, so the code word selection technique selects a code word using the MSV as in Equation below.

$$T_m = \arg \max_{W_l \in w} \lambda_{u,min}(R_u H_{uu} W_l) \quad (5)$$

A transmission precoder ($T_1$) of the base station1 110 is determined by an effective channel $R_1 H_{11}$ (or $R_1 H_{11} T_1$). Here, the '$R_1$' is a precoder nulling $H_{12} T_2$, so it varies depending on a transmission precoder ($T_2$) of the base station2 150.

For the same reasons, the transmission precoder ($T_2$) of the base station2 150 also varies depending on the transmission precoder ($T_1$) of the base station1 110. That is, each transmission precoder is determined in relation to a different transmission precoder, and the performance of the entire system is determined by a combination [$T_1$, $T_2$] of the transmission precoders.

Accordingly, the present invention proposes a method of selecting a combination of transmission precoders minimizing an error rate when considering the entire system. By using being bound by a minimum value among an MSV1 and an MSV2 of two effective channels $R_1 H_{11} T_1$ and $R_2 H_{22} T_2$, an average symbol error probability of the entire system selects a code word as in Equation below.

$$[T_1, T_2] = \arg \max_{[W_l, W_k] \in w^2} \quad (6)$$

$$\min(\lambda_{1,min}(R_1(H_{12} W_k) H_{11} W_l), \lambda_{2,min}(R_2(H_{21} W_l) H_{22} W_k))$$

As in Equation 6 above, the present invention selects a code word and determines a combination of transmission precoders. Here, the '$\lambda_{1,min}$ (MSV1)' is a value capable of being obtained in the terminal1, and the '$\lambda_{2,min}$ (MSV2)' in the terminal2 only, so there is a need to implement information exchange between terminals or between base stations for the sake of code word selection. The 'MSV1' and 'MSV2' have an $L^2$ number of values according to a combination of $W_l$ and $W_k$, respectively.

To select a code word combination as in Equation 6 above, each user should feed back an 'L×L' table composed of MSVs and share through a backhaul.

Figure 2:
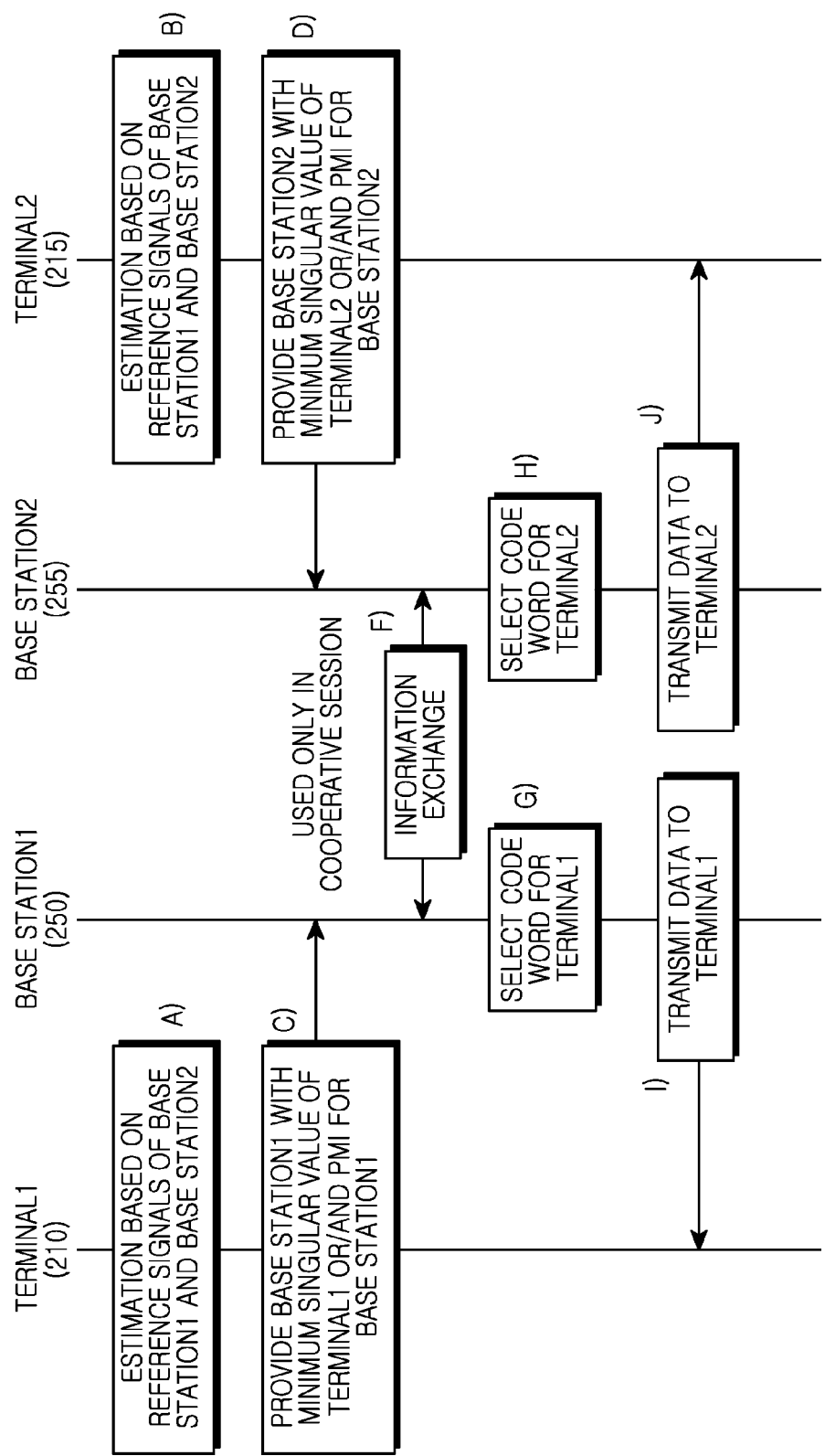
FIG. 2 is a flowchart illustrating an operation process of a base station and a terminal according to an exemplary embodiment of the present invention.
Figure 3:
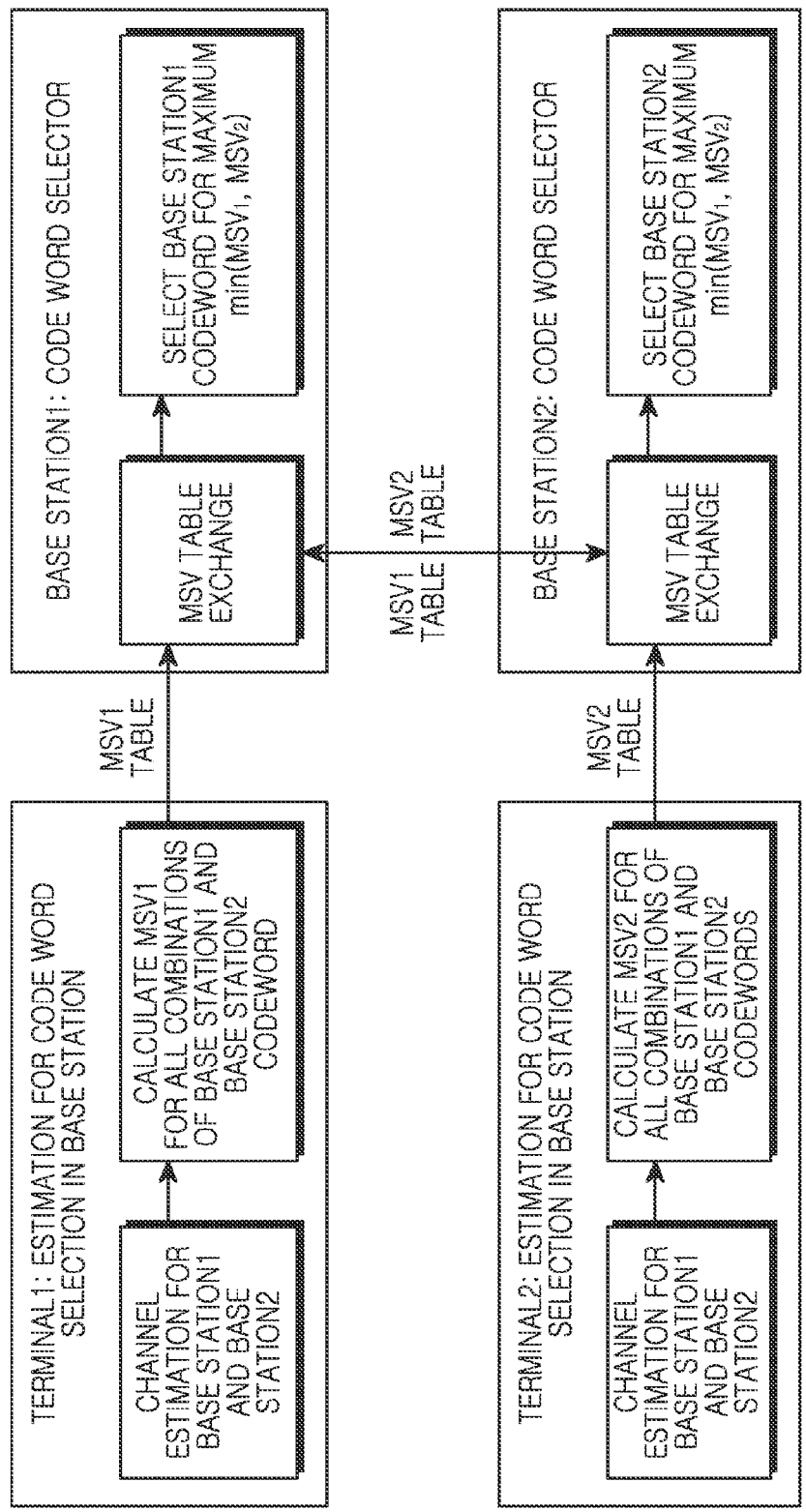
FIG. 3 is a block diagram illustrating schematic constructions of a terminal and a base station in a cooperative scheme according to an exemplary embodiment of the present invention.

In the cooperative scheme, the terminal1 115, the terminal2 165, the base station1 110, and the base station2 150 have a detailed structure of FIG. 3, and perform a process of FIG. 2 depending on time.

The terminal1 115 and terminal2 165 perform channel estimation and, on the basis of estimated channels, determine an MSV1 table and an MSV2 table and feed back to the base station1 110 and base station2 150, respectively.

The base station1 110 and base station2 150 exchange the fedback MSV1 table and MSV2 table with each other through a backhaul, and determine precoders of the base station1 110 and base station 2 150 according to a cooperative code word selection technique of Equation 6 above. Feeding back all of the MSV1 table and the MSV2 table as above is called full feedback.

Hence, the non-cooperative scheme is described below.

In code word selection, unlike the cooperative scheme, the non-cooperative scheme does not exchange information between base stations. The terminal1 115 and terminal2 165 have to select code words to be used by the base station1 110 and base station2 150 with information of their own MSV1 and MSV2 only. However, as mentioned earlier, the MSV1 and MSV2 are determined by a combination of code words $W_l$ and $W_k$ of the base station1 110 and base station2 150.

That is, the terminal1 115 selects a code word ($W_l$) to be used by the base station1 110 without information of a code word ($W_k$) used by the base station2 150, and the terminal2 165 selects the code word ($W_k$) to be used by the base station2 150 without information of the code word ($W_l$) used by the base station1 110.

When considering the entire system, errors are determined by a minimum MSV, so it should be such that a code word combination ([$T_1$, $T_2$]=[$W_l$, $W_k$]) selected by the terminal1 115 and terminal2 165 does not have a minimum MSV value to the maximum.

$$T_1 = \arg \max_{W_l \in w} \left( \min_{W_k \in w} \lambda_{1,min}(R_1(H_{12} W_k) H_{11} W_l) \right) \quad (7)$$

For this, as in Equation above, the terminal1 115 obtains an MSV1 when the code word ($W_k$) used by the base station2 150 is worst selected according to all code words ($W_l$) available by the base station1 110, and selects a code word ($W_l$) maximizing this MSV1.

$$T_2 = \arg \max_{W_k \in w} \left( \min_{W_l \in w} \lambda_{2,min}(R_2(W_l H_{21}) H_{22} W_k) \right) \quad (8)$$

Likewise, as in Equation 8 above, the terminal2 165 obtains an MSV2 when a code word ($W_l$) used by the base station1 110 is worst selected according to all code words ($W_k$) available by the base station2 150, and selects a code word ($W_k$) maximizing this MSV2.

This code word selection is a method of selecting its own base station precoder such that performance degradation is not large even in a case where a precoder of an interference base station is set worst, and has an effect of avoiding a minimum MSV value.

Figure 4:
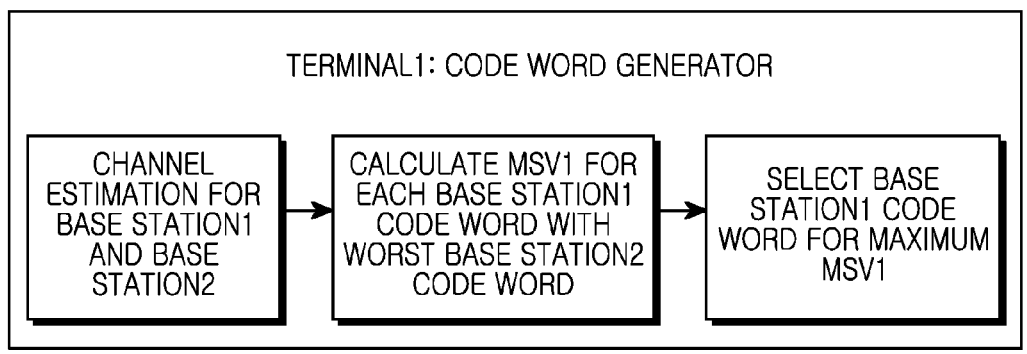
FIG. 4 is a block diagram illustrating schematic constructions of a terminal and a base station in a non-cooperative scheme according to an exemplary embodiment of the present invention.

In the non-cooperative scheme, a terminal has a function block of FIG. 4, and has a structure of adding an OCI-NF to a receiver (terminal) in a conventional quantization preprocessor and modifying a code word selector as in FIG. 4.

The terminal1 115 and terminal2 165 perform channel estimation and, on the basis of estimated channels, determine an MSV1 and an MSV2 suffering the worst interference (i.e., the worst-interfered MSV1 and the worst-interfered MSV2) and, on the basis of this, determine precoders of the base station1 110 and base station2 150 according to a non-cooperative code word selection technique of Equation 7 and Equation 8 above.

In a receiver terminal, a precoder to be used by a transmitter base station is determined, so it feeds back a corresponding code word index. That is, a technique of feeding back each of only a Precoding Matrix Index (PMI)1 and a PMI2 is called simple index feedback. This feedback is enough to feed back only an 'L' bit, in a case where the size of a codebook is equal to 'L'.

In the cooperative scheme, a cooperative scheme with reduced feedback is described below.

In order to prevent a feedback amount from increasing geometrically like $L^2$ as the size (L) of a codebook increases in cooperative-scheme full feedback, the present invention grafts a non-cooperative code word selection method used in a non-cooperative scheme.

Based on code words $\hat{T}_1$ and $\hat{T}_2$ selected by Equation 7 and Equation 8 above, the present invention selects a code word as in Equation 9 below to determine a transmission precoder combination.

$$[T_1, T_2] = \arg \max_{[\hat{T}_1, W_k] \in w^2 \propto [W_l, \hat{T}_2] \in w^2} (9)$$
$$\min(\lambda_{1,min}(R_1(H_{12}W_k)H_{11}W_l), \lambda_{2,min}(R_2(H_{21}W_l)H_{22}W_k))$$

This code word selection has the same effect of avoiding a minimum MSV value as in the non-cooperative scheme, and can improve performance through additional MSV feedback and cooperation.

Feeding back a PMI1, a PMI2, and an MSV corresponding to each PMI as mentioned earlier is called reduced feedback. This feedback feeds back an 'L' bit for a PMI and a (2L−1) number of MSVs, in a case where the size of a codebook is 'L'.

FIG. 2 is a flowchart illustrating an operation process of a base station and a terminal according to an exemplary embodiment of the present invention.

Referring to FIG. 2, a terminal1 210 and a terminal2 215 perform channel estimation based on reference signals of a base station1 250 and a base station2 255 (steps a, b).

After that, the terminal1 210 and terminal2 215 each obtain a minimum singular value (MSV1, MSV2) table, and feed back the minimum singular value table or a PMI value for each of the base stations 250 and 255 (steps c, d).

Next, the base station1 250 and base station2 255 select code words for the respective terminals 210 and 215 based on the received MSV (MSV1, MSV2) table or PMI, respectively (steps g, h).

In a case where this selection step uses full feedback or reduced feedback, as mentioned earlier, an MSV (MSV1, MSV2) table can be exchanged with each other between base stations (step f).

After that, the base station1 250 and base station2 255 transmit data to the respective terminals 210 and 215 using the selected code words (steps i, j).

FIG. 3 is a block diagram illustrating schematic constructions of a terminal and a base station in a cooperative scheme according to an exemplary embodiment of the present invention.

Referring to FIG. 3, a terminal1 and a terminal2 do channel estimation and, on the basis of estimated channels, determine an MSV1 table and an MSV2 table and feed back to a base station1 and a base station2.

The base station1 and base station2 exchange the fedback MSV1 table and MSV2 table with each other through a backhaul, and determine precoders of the base station1 and base station2 according to a cooperative code word selection technique of Equation 5 above.

FIG. 4 is a diagram illustrating schematic constructions of a terminal and a base station in a non-cooperative scheme according to an exemplary embodiment of the present invention.

Referring to FIG. 4, a terminal1 does channel estimation and, on the basis of an estimated channel, determines an MSV1 and an MSV2 suffering the worst interference (the worst-interfered MSV1 and the worst-interfered MSV2) and, on the basis of this, determines a precoder of a base station1 according to a non-cooperative code word selection technique of Equation 7 and Equation 8 above.

After that, the receiver terminal determines a precoder to be used in the transmitter base station, so it feeds back only a corresponding code word index identically with a conventional quantization preprocessor. It is usable adding an OCI-NF to the receiver (terminal) in the quantization preprocessor and modifying a code word selector as in FIG. 4.

Figure 5:
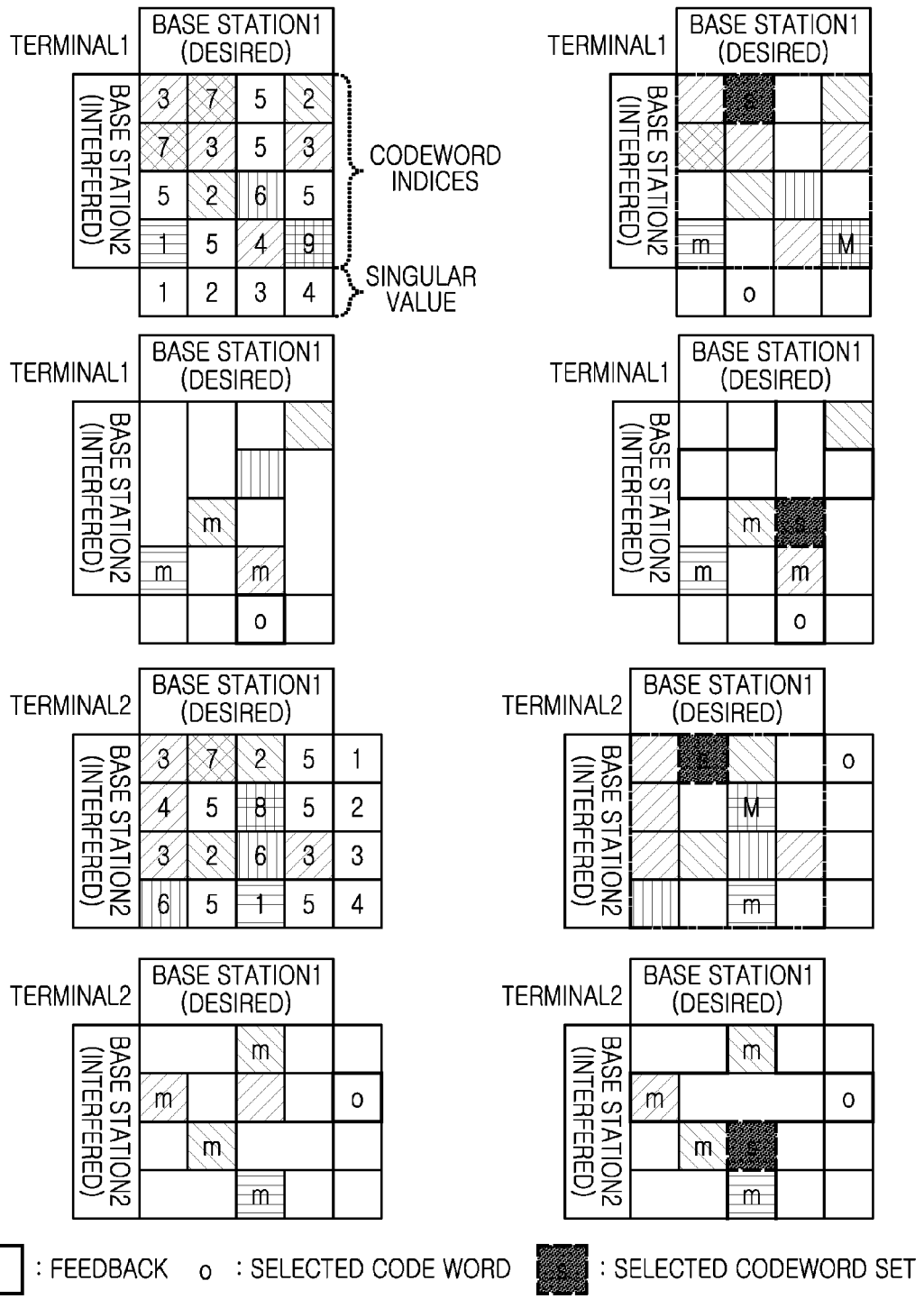
FIG. 5 is a diagram illustrating an example of a code word selected in accordance with a feedback technique according to an exemplary embodiment of the present invention.

FIG. 5 is a diagram illustrating an example of a code word selected in accordance with a feedback technique according to an exemplary embodiment of the present invention.

Referring to FIG. 5, it represents an exemplary implementation of an MSV1 and an MSV2 for a case where 'L' is equal to '4'. In a case (1) of a cooperative scheme with full feedback, a selected precoder combination is equal to [$W_2$, $W_1$], and a minimum MSV is equal to 'min (7, 7)=7'.

In a case of a non-cooperative scheme with simple index feedback, a selected precoder combination is equal to [$W_3$, $W_2$], and a minimum MSV is equal to 'min (5, 8)=5'. In a case of a terminal1 115, if $W_l = W_1$, an MSV1 has a minimum value '1' when $W_k = W_4$ and, if $W_l = W_2$, the MSV1 has a minimum value '2' when $W_k = W_3$. If obtaining the minimum value of the MSV1 for each precoder $W_l$ as above, it is equal to '1', '2', '4', and '2' in order. This is an MSV1 when an interference base station precoder $W_k$ of the worst combination with each precoder $W_l$ is selected, and $W_l = W_3$ in which this value is the largest '4' is selected and its index is fed back. Through the same process, even a terminal2 165 selects $W_k = W_2$ having a minimum value '4' and feeds back its index. Accordingly, a selected precoder combination is equal to [$W_3$, $W_2$].

In a case of a cooperative scheme with reduced feedback, a selected precoder combination is equal to [$W_3$, $W_3$], and a minimum MSV is equal to 'min(6, 6)=6'.

Figure 6:
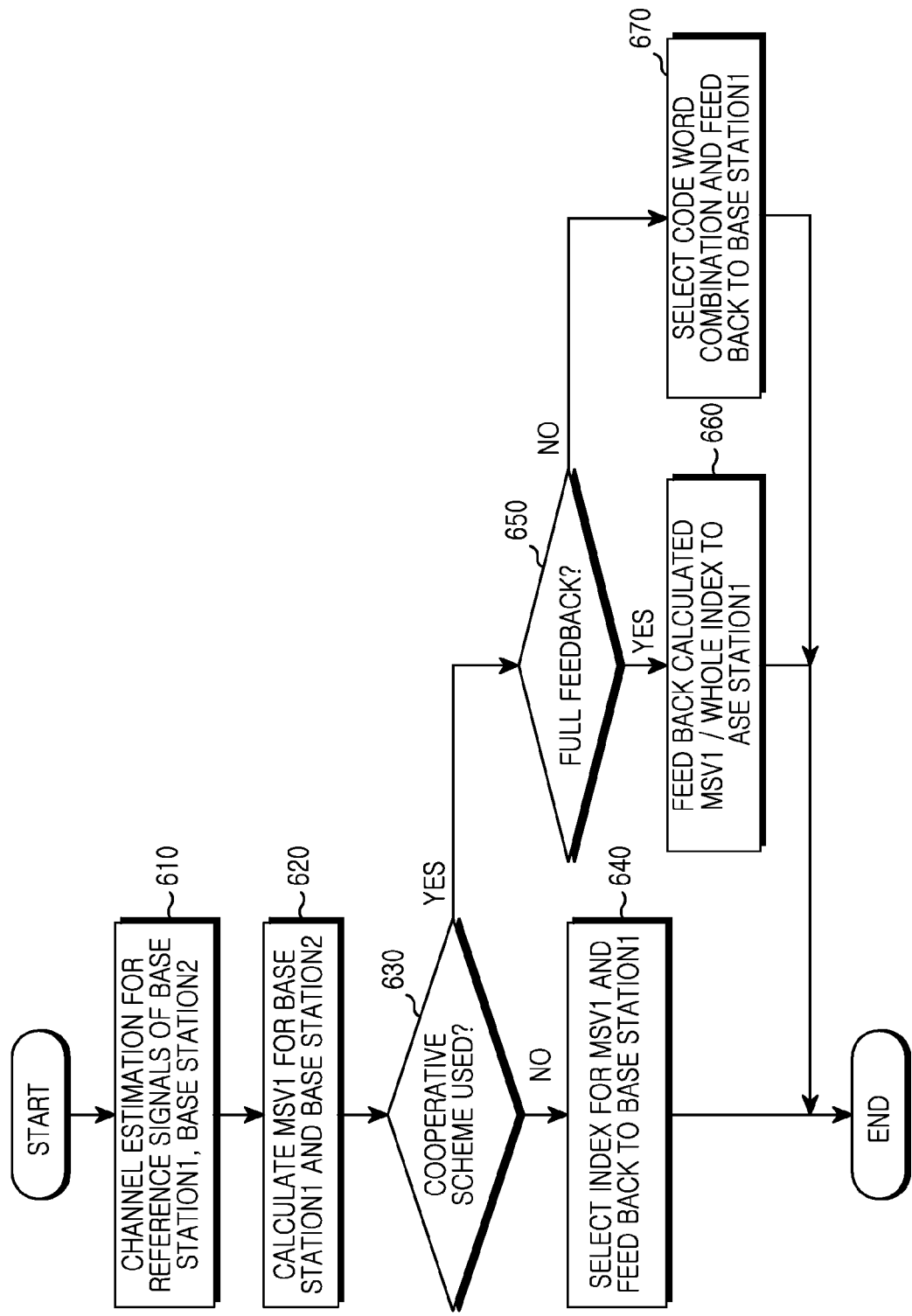
FIG. 6 is a flowchart illustrating an operation process of a terminal according to an exemplary embodiment of the present invention.

FIG. 6 is a flowchart illustrating an operation process of a terminal according to an exemplary embodiment of the present invention.

Referring to FIG. 6, a terminal (assuming a terminal1 115) performs channel estimation for reference signals of a base station1 and a base station2 (step 610). Here, the base station1 is a serving base station, and the base station2 represents a base station other than the serving base station. After that, the terminal determines an MSV1 for the base station1 and the base station2 (step 620).

If a cooperative scheme is not used (step 630), the terminal selects a precoder (code word) index for the MSV1 and feeds back this to the base station (step 640).

If the cooperative scheme is used (step 630) and full feedback is used (step 650), the terminal feeds back the entire table of the determined MSV1 to the base station (step 660).

If the cooperative scheme is used (step 630) and reduced feedback is used, the terminal selects a code word combination and feeds back the selected code word combination (step 670). The code word combination can include a selected MSV table and an index for this.

Figure 7:
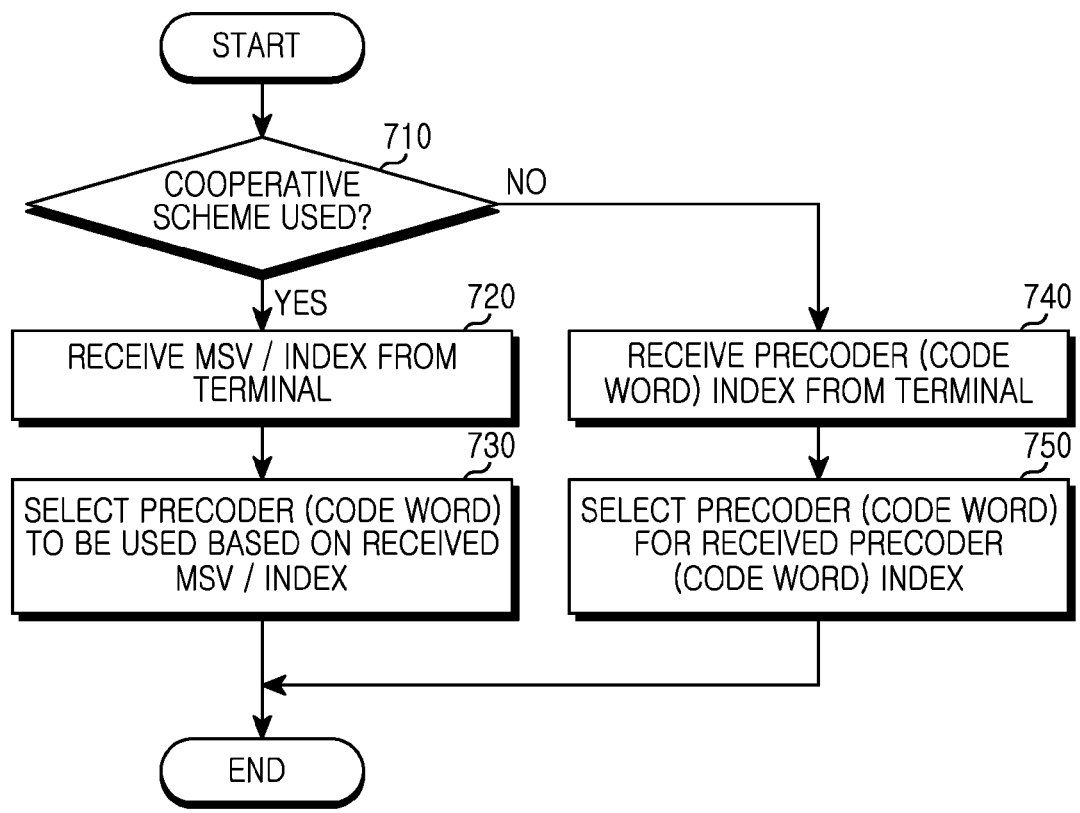
FIG. 7 is a flowchart illustrating an operation process of a base station according to an exemplary embodiment of the present invention.

FIG. 7 is a flowchart illustrating an operation process of a base station according to an exemplary embodiment of the present invention.

Referring to FIG. 7, in a case where a cooperative scheme is used (step 710), the base station receives an MSV from a terminal (step 720). After that, the base station selects a precoder (code word) to be used, based on the received MSV value (step 730). The precoder (code word) selection process is, as aforementioned, composed of a full feedback technique and a reduced feedback technique according to the received MSV.

If the cooperative scheme is not used (step 710), the base station receives a precoder (code word) index from the terminal (step 740). After that, the base station selects a precoder (code word) for the received precoder (code word) index (step 750).

Figure 8:
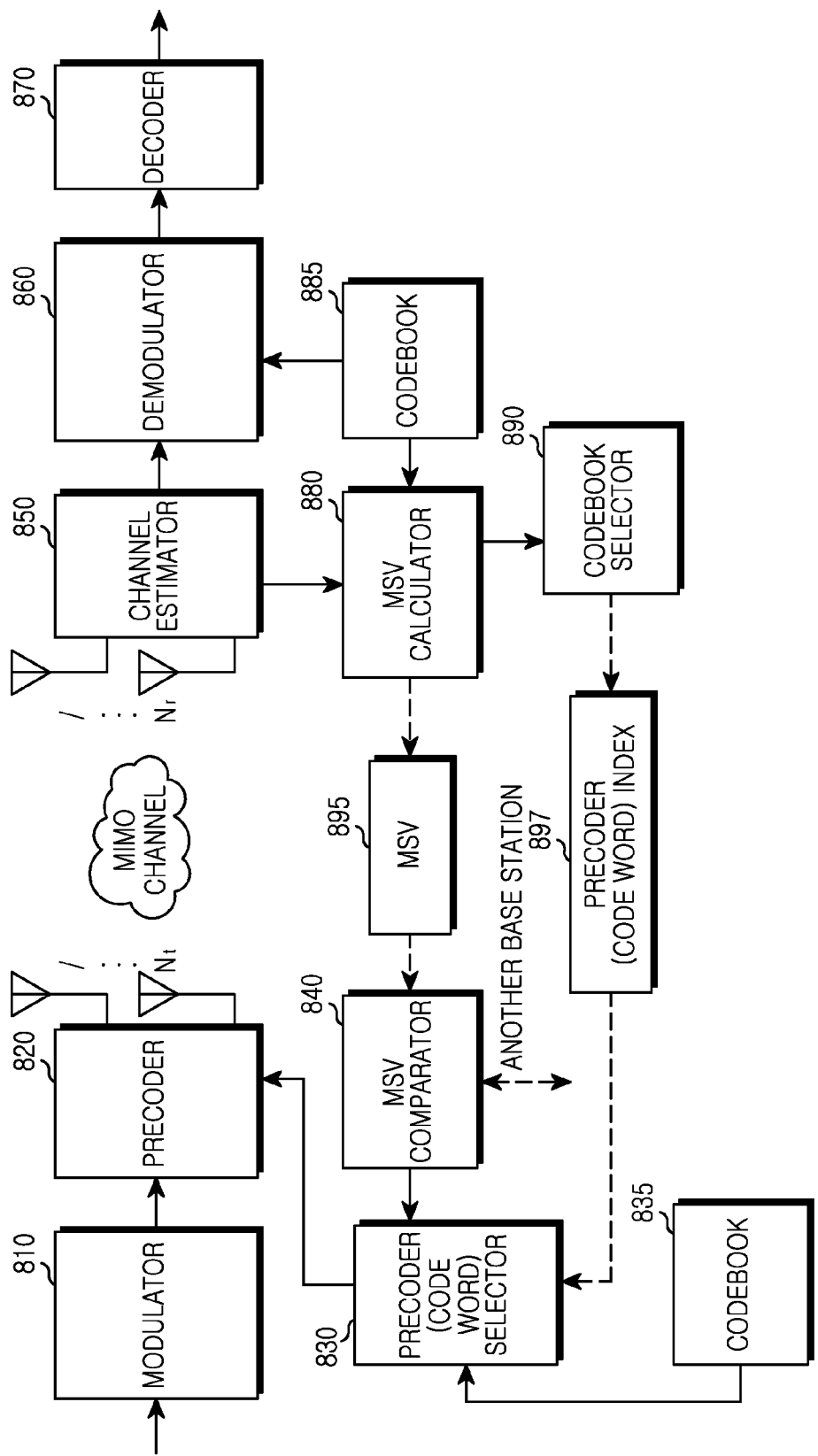
FIG. 8 is a block diagram illustrating constructions of a base station and a terminal according to an exemplary embodiment of the present invention.

FIG. 8 is a block diagram illustrating constructions of a base station and a terminal according to an exemplary embodiment of the present invention.

Referring to FIG. 8, the base station includes a modulator 810, a precoder 820, a precoder (code word) selector 830, a codebook 835, and an MSV comparator 840, and the terminal includes a channel estimator 850, a demodulator 860, a decoder 870 an MSV calculator 880, a codebook 885, and a codebook selector 890.

First, the terminal is described. The channel estimator 850 performs channel estimation for a signal transmitted by the base station, and the demodulator 860 performs a demodulation process, and the decoder 870 a decoding process.

The MSV calculator 880 determines, as mentioned earlier, an MSV based on a channel estimation value that the channel estimator 850 performs for a reference signal transmitted by the base station.

And, the determined MSV 895 and an index for an MSV selected by the codebook selector 890 of a codebook 885, i.e., a precoder (code word) index 897 are fed back to the base station. The aforementioned feedback process is implemented by, though not illustrated, a transmitting unit including a transmission modem.

Hence, the base station is described. A signal transmitted by the base station is modulated through the modulator 810 and is precoded through the precoder 820 and then, is transmitted through an antenna to airs.

The base station receives the MSV 895 or the precoder (code word) index 897. After that, the MSV comparator 840 compares, as mentioned earlier, its own MSV value with another base station using a full feedback technique or a reduced feedback technique, and provides the comparison result to the precoder (code word) selector 830. The MSV comparator 840 can exchange the MSV with another base station through a backhaul.

The precoder (code word) selector 830 determines a codebook 835 to be used, i.e., a precoder (code word) based on the comparison result, and provides this to the precoder 820. The precoder 820 performs precoding using the determined precoder (code word).

In a case where the non-cooperative scheme is used, the precoder (code word) index 897 is provided to the precoder (code word) selector 830. The precoder (code word) selector 830 selects a precoder (code word) to be used based on the precoder (code word) index 897, and provides this to the precoder 820. The precoder 820 performs precoding using the determined precoder (code word).

Hence, the simulation result for the invention is described below.

In the present invention, it was assumed that there were two user terminal1 115 and terminal2 165 allocated the same time and frequency resources at a boundary of two cells.

The environment was that interference acts very greatly because a base station1 110 transmits data to the terminal1 115 and simultaneously, a base station2 150 to the terminal2 165. The experiment was conducted for cases where the number ($n_T$) of transmit antennas of base stations is equal to '4' and the number ($n_R$) of receive antennas of terminals is equal to '2' or '4', and it was assumed that there is no correlation between antennas. For the sake of the equal comparison, sum-rates of all techniques were standardized as 8 bps/Hz and Bit Error Rate (BER) performance were compared.

Figure 9:
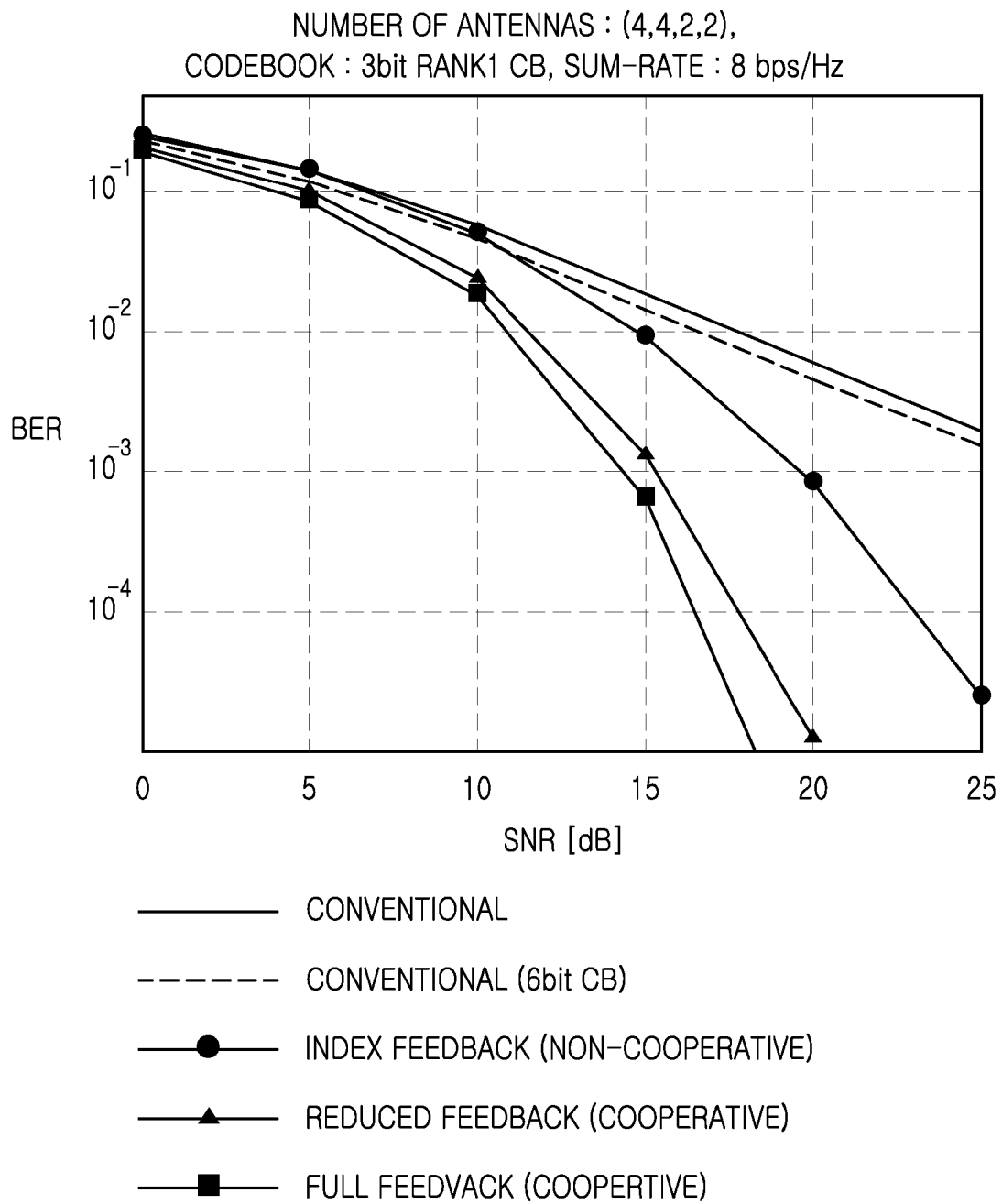
FIG. 9 is a 1st diagram illustrating BER performance according to an exemplary embodiment of the present invention.

FIG. 9 is a 1st diagram illustrating BER performance according to an exemplary embodiment of the present invention.

Referring to FIG. 9, it represents BER performance (two receive antennas, a rank1 codebook, and a 16QAM) of the conventional art and the present invention and, if using a rank1 precoder, it can use an OCI-NF. It can be appreciated that the present invention is superior in diversity order and SNR gain aspects, compared to a conventional quantization preprocessor.

Figure 10:
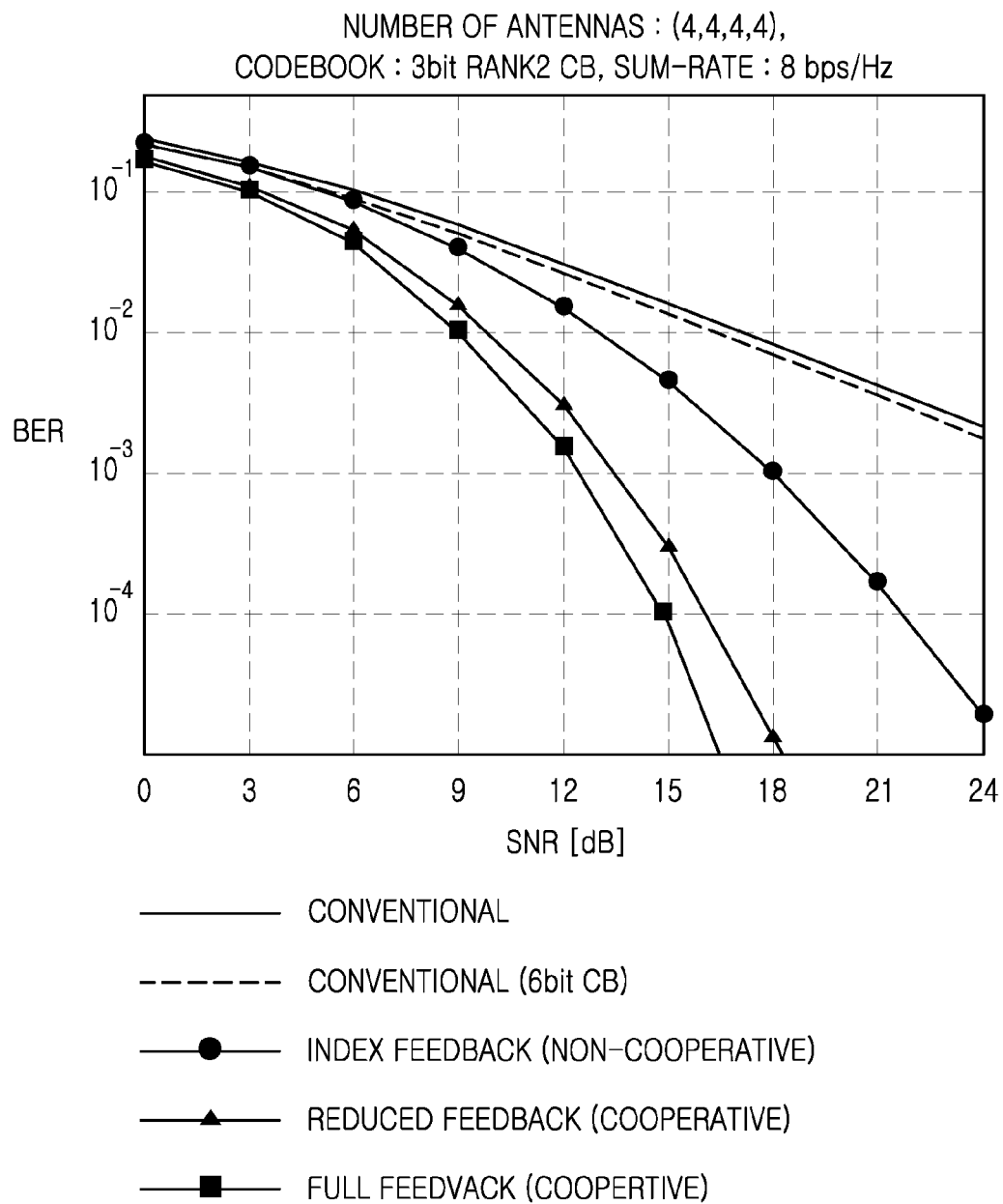
FIG. 10 is a 2nd diagram illustrating BER performance according to an exemplary embodiment of the present invention.

FIG. 10 is a 2nd diagram illustrating BER performance according to an exemplary embodiment of the present invention.

Referring to FIG. 10, it represents BER performance (four receive antennas, a rank2 codebook, and a QPSK) of the conventional art and the present invention and, if using a rank2 precoder, it can use an OCI-NF. The present invention can confirm that diversity order and SNR gain aspects are all improved compared to a conventional quantization preprocessing technique.

A non-cooperative scheme (simple index feedback) of the present invention has more superior performance than not only a conventional quantization technique using a 3-bit codebook having the same feedback but also an existing quantization technique using a 6-bit codebook having twice feedback for a similar operation amount.

A cooperative scheme of the present invention is more excellent than the non-cooperative scheme by a performance gain through information exchange between base stations.

The present invention minimizes errors of a cell edge through a codebook-based MIMO precoding and a receiver OCI-NF. The present invention does not have a loss resulting from the OCI-NF through transmission precoder (code word) selection taking the OCI-NF into consideration, and has an advantage of being capable of additionally reducing an error rate in a cell edge through information exchange between base stations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A precoder selection method of a terminal in a multiple antenna system, the method characterized by comprising:
   performing, by the terminal, channel estimation based on reference signals of a serving base station and another base station;

determining, by the terminal, an effective channel that applies to a first plurality of code words of the serving base station by cancelling an interference channel that applies to a second plurality of code words of the other base station based on the channel estimation;

determining, by the terminal, a plurality of minimum singular values of the effective channel, according to a combination of the first plurality of code words and the second plurality of code words; and transmitting, to the serving base station, at least one of at least one minimum singular value from the determined plurality of minimum singular values of the effective channel to the serving base station and one of the first plurality of code words.

2. The method of claim 1, further comprising:
selecting the one of the first plurality of code words.

3. The method of claim 2, wherein the step of selecting the one of the first plurality of code words comprising:
selecting a minimum value of minimum singular values of each of the first plurality of code words;
selecting a maximum value of each minimum values of the first plurality of code words; and
selecting a code word corresponding to the maximum value from the first plurality of code words.

4. The method of claim 1, further comprising:
selecting the at least one minimum singular value from the determined plurality of minimum singular values of the effective channel.

5. The method of claim 4, wherein the step of selecting the at least one minimum singular value comprising:
selecting a minimum value of minimum singular values of each of the first plurality of code words;
selecting a first maximum value of each minimum values of the first plurality of code words; and
selecting first minimum singular values of a first code word corresponding to the maximum value from the first plurality of code words.

6. The method of claim 5, further comprising:
selecting a minimum value of minimum singular values of each of the second plurality of code words;
selecting a second maximum value of each minimum values of the second plurality of code words; and
selecting second minimum singular values of a second code word corresponding to the second maximum value from the second plurality of code words.

7. A precoder selection method of a base station in a multiple antenna system, the method characterized by comprising:
receiving at least one of at least one first minimum singular value of a first effective channel and a first code word of first plurality of code words from a first terminal;
receiving at least one of at least one second minimum singular value of a second effective channel and a second code word of second plurality of code words from a second terminal; and
determining a code word set for the first terminal and a second terminal by comparing the at least one minimum singular value of the first terminal with at least one minimum singular value of the second terminal.

8. The method of claim 7, wherein the step of determining the code word set for the first terminal and a second terminal comprising:
generating at least one new minimum singular value by comparing the at least one minimum singular value of the first terminal with at least one minimum singular value of the second terminal;
selecting a maximum value of at least one new minimum singular value; and
determining the code word set of the new minimum singular value corresponding to the maximum value.

9. The method of claim 8, wherein the new minimum singular comprises a minimum value of the minimum singular value of the first terminal and the minimum singular value of the second terminal.

10. The method of claim 7, wherein if the first code word of the first terminal is different from a code word of the first terminal of the code word set, selecting the code word of the first terminal of the code word set as a code word for the first terminal, and
if the second code word of the second terminal is different from a code word of the second terminal of the code word set, selecting the code word of the second terminal of the code word set as a code word for the second terminal.

11. An apparatus of a terminal of selecting a code word in a multiple antenna system, the apparatus characterized by comprising:
a channel estimator configured to perform channel estimation based on reference signals of a serving base station and another base station;
a minimum singular value calculator configured to determine an effective channel that applies to a first plurality of code words of the serving base station by cancelling an interference channel that applies to a second plurality of code words of the other base station based on the channel estimation and determine a plurality of minimum singular values of the effective channel according to a combination of the first plurality of code words and the second plurality of code words; and
a transmitter configured to transmit, to the serving base station, at least one of at least one minimum singular value from the determined plurality of minimum singular values of the effective channel and one of the first plurality of code words.

12. The apparatus of claim 11, wherein the minimum singular value calculator is further configured to selects the one of the first plurality of code words.

13. The apparatus of claim 12, wherein the minimum singular value calculator is configured to:
select a minimum value of minimum singular values of each of the first plurality of code words;
select a maximum value of each minimum values of the first plurality of code words; and
select a code word corresponding to the maximum value from the first plurality of code words.

14. The apparatus of claim 11, wherein the minimum singular value calculator is further configured to select the at least one minimum singular value from the determined plurality of minimum singular values of the effective channel.

15. The apparatus of claim 14, wherein the minimum singular value calculator is configured to:
select a minimum value of minimum singular values of each of the first plurality of code words;
select a first maximum value of each minimum values of the first plurality of code words; and
select first minimum singular values of a first code word corresponding to the maximum value from the first plurality of code words.

16. The apparatus of claim 15, wherein the minimum singular value calculator is configured to:
select a minimum value of minimum singular values of each of the second plurality of code words;

select a second maximum value of each minimum values of the second plurality of code words; and select second minimum singular values of a second code word corresponding to the second maximum value from the second plurality of code words.

17. An apparatus of a base station of selecting a precoder in a multiple antenna system, the apparatus characterized by comprising:

a minimum singular value comparator configured to receive at least one second minimum singular value of a second effective channel and a second code word of second plurality of code words from a second terminal from a first terminal and receive at least one of at least one second minimum singular value of a second effective channel and a second code word of second plurality of code words from a second terminal; and a code word selector configured to determine a code word set of the first terminal and a second terminal by comparing the at least one of minimum singular value of the first terminal with at least one of minimum singular value of the second terminal.

18. The apparatus of claim 17, wherein the code word selector is further configured to:

generate at least one new minimum singular value by comparing the at least one minimum singular value of the first terminal with at least one minimum singular value of the second terminal;

select a maximum value of at least one new minimum singular value; and determine the code word set of the new minimum singular value corresponding to the maximum value.

19. The apparatus of claim 18, wherein the new minimum singular comprises a minimum value of the minimum singular value of the first terminal and the minimum singular value of the second terminal.

20. The apparatus of claim 17, wherein if the first code word of the first terminal is different from a code word of the first terminal of the code word set, the code word selector selects the code word of the first terminal of the code word set as a code word for the first terminal, and if the second code word of the second terminal is different from a code word of the second terminal of the code word set, the code word selector selects the code word of the second terminal of the code word set as a code word for the second terminal.

* * * * *